(12) United States Patent
Vlassiouk et al.

(10) Patent No.: US 10,836,132 B2
(45) Date of Patent: Nov. 17, 2020

(54) GRAPHENE REINFORCED MATERIALS AND RELATED METHODS OF MANUFACTURE

(71) Applicant: UT-Battelle, LLC, Oak Ridge, TN (US)

(72) Inventors: Ivan V. Vlassiouk, Oak Ridge, TN (US); Ilia N. Ivanov, Knoxville, TN (US); Panagiotis G. Datskos, Knoxville, TN (US)

(73) Assignee: UT-Battelle, LLC, Oak Ridge, TN (US)

(*) Notice: Subject to any disclaimer, the term of this patent is extended or adjusted under 35 U.S.C. 154(b) by 0 days.

(21) Appl. No.: 16/135,382

(22) Filed: Sep. 19, 2018

(65) Prior Publication Data
US 2019/0061303 A1 Feb. 28, 2019

Related U.S. Application Data

(62) Division of application No. 14/217,759, filed on Mar. 18, 2014, now Pat. No. 10,093,072.

(51) Int. Cl.
B23B 9/00 (2006.01)
B32B 1/00 (2006.01)
(Continued)

(52) U.S. Cl.
CPC ............ B32B 1/00 (2013.01); B32B 15/08 (2013.01); B32B 18/00 (2013.01); C01B 32/186 (2017.08);
(Continued)

(58) Field of Classification Search
CPC ........ C01B 31/04; Y10T 428/30; B82Y 30/00
(Continued)

(56) References Cited

U.S. PATENT DOCUMENTS 8,398,949 B2 3/2013 Meyer et al.
8,449,959 B2 5/2013 Aksay et al.
(Continued)

FOREIGN PATENT DOCUMENTS

EP 2354272 A1 8/2011
EP 2489520 A2 8/2012
(Continued)

OTHER PUBLICATIONS

Shuze Zhu and Teng Li, "Hydrogenation enabled scrolling of graphene," Journal of Physics D: Applied Physics, published Jan. 23, 2013, pp. 1-8.
(Continued)

Primary Examiner — Daniel H Miller
(74) Attorney, Agent, or Firm — Warner Norcross + Judd LLP

(57) ABSTRACT

Graphene reinforced materials and related methods of manufacture are provided. The graphene reinforced materials include graphene sheet or scroll, graphene-polymer sheet or scroll, and graphene-carbon sheet or scroll, each having material properties that are attractive across a broad range of applications and industries. The graphene reinforced materials generally include monolayer or multilayer graphene that is synthesized by annealing a catalyst substrate within a CVD chamber, introducing a hydrocarbon gas as a carbon source with the CVD chamber to form a layer of graphene on the catalyst substrate, detaching the catalyst substrate from the layer of graphene, and rolling the layer of graphene onto itself to form a scroll, optionally with the addition of a polymer layer or carbonized layer on the graphene layer.

7 Claims, 7 Drawing Sheets

(51) Int. Cl.
| | |
|---|---|
| *B32B 18/00* | (2006.01) |
| *C01B 32/186* | (2017.01) |
| *C01B 32/194* | (2017.01) |
| *C04B 35/52* | (2006.01) |
| *C04B 35/622* | (2006.01) |
| *B32B 15/08* | (2006.01) |

(52) U.S. Cl.
CPC ......... *C01B 32/194* (2017.08); *C04B 35/522* (2013.01); *C04B 35/62218* (2013.01); *B32B 2255/10* (2013.01); *B32B 2255/20* (2013.01); *C04B 2235/94* (2013.01); *C04B 2235/96* (2013.01); *C04B 2237/363* (2013.01); *Y10T 156/1038* (2015.01); *Y10T 428/30* (2015.01)

(58) Field of Classification Search
USPC .......................................... 428/408; 423/448
See application file for complete search history.

(56) References Cited

U.S. PATENT DOCUMENTS

| | | |
|---|---|---|
| 8,535,553 B2 | 9/2013 | Kong et al. |
| 2009/0124705 A1 | 5/2009 | Meyer et al. |
| 2010/0021708 A1 | 1/2010 | Kong et al. |
| 2011/0135884 A1 | 6/2011 | Lettow et al. |
| 2012/0070612 A1 | 3/2012 | Lee et al. |
| 2012/0100203 A1 | 4/2012 | Fang et al. |
| 2012/0251432 A1 | 10/2012 | Cooper et al. |
| 2013/0174968 A1 | 7/2013 | Vlassiouk et al. |
| 2013/0187097 A1 | 7/2013 | Hong et al. |

FOREIGN PATENT DOCUMENTS

| | | |
|---|---|---|
| IN | 2915/DEL/2010 A | 6/2012 |
| WO | 2013/043120 A1 | 3/2013 |
| WO | 2013/066269 A1 | 5/2013 |
| WO | 2013/119295 A9 | 8/2013 |
| WO | 2013/144640 A1 | 10/2013 |

OTHER PUBLICATIONS

Lisa M. Viculis et al, "A Chemical Route to Carbon Nanoscrolls," Science Magazine, vol. 299, published Feb. 28, 2003, p. 1361.

Lima, M.D. et al, "Biscrolling Nanotube Sheets and Functional Guests into Yarns", Science, Jan. 2011, vol. 331, No. 6013, pp. 51-55.

Zhengzong, S. et al, "Growth of graphene from solid carbon sources", Nature, Nov. 2010, vol. 268, No. 7323, pp. 549-552.

Young, K. et al, "Strong Dependence of Mechanical Properties on Fiber Diameter for Polymer—Nanotube Composite Fibers: Differentiating Defect from Orientation Effects", ACS Nano, Oct. 2010, vol. 4, No. 11; pp. 6989-6997.

International Search Report and the Written Opinion of the International Searching Authority for International Application No. PCT/US15/20366 dated Jun. 29, 2015.

Mirsaidov, Utkur, et al. "Scrolling graphene into nanofluidic channels." Lab on a Chip 13.15 (2013): 2874-2878.

Xie, Xu, et al. "Controlled fabrication of high-quality carbon nanoscrolls from monolayer graphene." Nano letters 9.7 (2009): 2565-2570.

GRAPHENE-REINFORCED
CARBON HETEROSTRUCTURE

GRAPHENE REINFORCED MATERIALS AND RELATED METHODS OF MANUFACTURE

CROSS-REFERENCE TO RELATED APPLICATIONS

This application is a divisional of U.S. Non-provisional patent application Ser. No. 14/217,759, filed on Mar. 18, 2014, the disclosure of which is hereby incorporated by reference in its entirety.

GOVERNMENT SUPPORT

This invention was made with government support under Contract No. DE-AC05-00OR22725 awarded by the U.S. Department of Energy. The government has certain rights in the invention.

BACKGROUND OF THE INVENTION

The present invention relates to graphene reinforced materials and related methods of manufacture.

Graphene is an individual layer of carbon having a hexagonal bonding structure in a one-atom thick sheet. Graphene is known to exhibit low densities (<0.77 mg/m$^2$) and a high tensile strength (>130,000 MPa). The tensile strength of graphene is greater than that of carbon steel (850 MPa), diamond (2,800 MPa), aramid (3,700) and carbon fiber (6000 MPa). In view of the desirable mechanical properties of graphene, a reliable technology for the scalable production of graphene articles is desired.

One known technique for graphene production includes mechanical exfoliation of graphite crystals. However, graphene produced by this method yields unconnected micrometer-sized graphene crystals in a powder form which has certain limitations in material reinforcement applications. Another known technique includes chemical vapor deposition at low pressures. According to this method, a metal substrate is annealed in a reducing atmosphere. After annealing, the metal substrate is exposed to a carbon source in a low pressure reactor to synthesize graphene. A variety of organic gases and solids can be used as the carbon source for graphene growth, with methane gas being a widely used precursor. However, the metal substrate can be difficult to feed into the low pressure reactor, accompanied by severe evaporation of the metal and the requirement of a vacuum system compatible with flammable precursor gases.

SUMMARY OF THE INVENTION

Graphene articles and related methods of manufacture are provided. The graphene articles include for example substantially pure graphene scroll, graphene reinforced sheet, and graphene reinforced scroll (also referred to herein as graphene reinforced fiber and graphene reinforced thread), each having material properties that are attractive across a broad range of applications and industries. The graphene articles generally include monolayer or multilayer graphene that is grown by chemical vapor deposition (CVD), optionally at atmospheric pressure.

In one embodiment, a substantially pure graphene scroll is provided. The substantially pure graphene scroll is cylindrical and has a spiral cross-section with multiple internal walls, providing a yield tensile strength greater than 10 GPa in some applications. A method for forming the graphene scroll includes annealing a catalyst substrate within a CVD chamber, introducing a hydrocarbon gas as a carbon source with the CVD chamber to form at least one layer of graphene on the catalyst substrate, dissolving the catalyst substrate from the at least one layer of graphene, and rolling the at least one layer of graphene onto itself to form a scroll. This method can optionally include delaminating the graphene layer from the catalyst substrate, for example electrochemical delamination, as an alternative to dissolving the catalyst substrate.

In another embodiment, a graphene-polymer sheet is provided. The graphene-polymer sheet includes a graphene layer and a polymer layer extending over a major surface of the graphene layer. The graphene-polymer sheet is optionally rolled into a cylindrical scroll having a spiral cross-section with multiple internal walls. A method for forming a graphene-polymer sheet includes annealing a catalyst substrate within a CVD chamber, introducing a hydrocarbon gas as a carbon source with the CVD chamber to form at least a layer of graphene on the catalyst substrate, depositing a polymer film onto the layer of graphene, and detaching the catalyst substrate from the layer of graphene. The polymer film can include lignin, polyacrylonitrile, polymethyl methacrylate, polystyrene, polycarbonate, polyimides, polypropylene, polyethylene terephthalate, polyvinylchloride and others. The graphene reinforces the polymer film, while also functioning as a template which aligns polymer chains during fabrication.

In another embodiment, a graphene-carbon sheet is provided. The graphene-carbon sheet includes a graphene layer and a carbon layer extending over a major surface of the graphene layer. The graphene-carbon sheet is optionally rolled into a cylindrical scroll having a spiral cross-section with multiple internal walls. A method for forming the graphene-carbon sheet includes annealing a catalyst substrate within a CVD chamber, introducing a hydrocarbon gas as a carbon source with the CVD chamber to form at least one layer of graphene on the catalyst substrate, depositing a polymer film onto the layer of graphene, and heat treating the polymer film to carbonize the polymer.

These and other features and advantages of the present invention will become apparent from the following description of the invention, when viewed in accordance with the accompanying drawings and appended claims.

DETAILED DESCRIPTION OF THE CURRENT EMBODIMENTS

The current embodiments include substantially pure graphene scroll, graphene reinforced sheet, graphene reinforced scroll, and related methods of manufacture. As set forth more fully below, the graphene scroll, the graphene reinforced sheet, and the graphene reinforced scroll are formed by CVD deposition, optionally achieving a tensile strength that exceeds that of carbon fiber and aramid, and including material properties that are attractive across a broad range of applications and industries.

Figure 1:
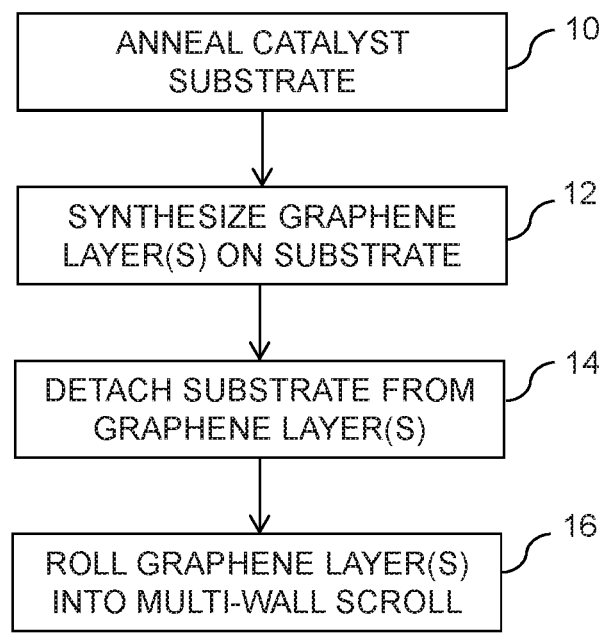
FIG. 1 is a flow chart illustrating a method for the controlled synthesis of large area single-layer or multi-layer graphene for a graphene scroll.

Referring now to FIG. 1, a flow chart illustrating graphene scroll formation is illustrated. In general terms, a method for forming graphene scroll in accordance with one embodiment can include the following steps: a) annealing a catalyst substrate within a CVD chamber, b) introducing a hydrocarbon gas as a carbon source with the CVD chamber to form at least a layer of graphene on the catalyst substrate, c) detaching the catalyst substrate from the at least one layer of graphene, and d) rolling the at least one layer of graphene onto itself to form a scroll.

Annealing the catalyst substrate is depicted as step 10 in FIG. 1. The catalyst substrate includes a dimensionally stable sheet material for synthesizing graphene thereon. The sheet material includes copper foil in the present embodiment, but can include other materials in other embodiments. For example, the sheet material can include nickel, iron, cobalt, platinum, silicon, silicon carbide, silicon dioxide, silicon nitride, hafnium oxide, zirconium oxide, boron oxide, magnesium oxide or aluminum oxide. The copper foil is optionally a "low" purity copper foil with an impurities content up to 10% (e.g., 0.0025 mm thick 99.8% copper foil, available from Alfa Aesar of Ward Hill, Mass. as #13382) or a "high" purity copper foil (e.g., 0.0025 mm thick 99.999% copper foil, available from Alfa Aesar of Ward Hill, Mass. as #10950).

Annealing conditions can be selected to promote graphene grain growth, avoid vaporization of the catalyst substrate, and avoid substantial surface oxidation of the catalyst substrate. The annealing conditions include an annealing temperature, a temperature ramp rate, and an annealing duration. For example, annealing can occur at a temperature between about 600° C. to about 1100° C., with a temperature ramp rate from about 10° C./min to about 1000° C./min, and an annealing duration from about 1 minute to about 120 minutes. In the current embodiment, annealing is generally performed in a CVD chamber in the presence of hydrogen gas at atmospheric pressure. In other embodiments, annealing is performed at atmospheric pressure in the presence of one or more noble gases e.g., helium, neon, argon, or xenon, or in the presence of an inert gas such as nitrogen. Alternatively, annealing can be performed in a low pressure environment or in a vacuum environment within a CVD chamber.

Introducing a hydrocarbon as a gas source is depicted as step 12 in FIG. 1. The hydrocarbon includes methane in the present embodiment, but can additionally or alternatively include ethane, propane, and butane, for example. The hydrocarbon interacts with the upward facing surface of the annealed substrate within a quartz CVD chamber for the controlled formation of large-area (e.g., >1 mm) graphene on the annealed substrate. The hydrocarbon forms part of a reaction gas mixture, which optionally includes hydrogen and further optionally includes a buffer gas. Hydrogen can be present in the reaction gas mixture with a partial pressure of between about 0 Torr and about 25 Torr, further optionally between about 10 Torr and about 25 Torr, still further optionally between about 25 Torr and about 500 Torr, and even further optionally about 760 Torr. Methane can be present in the reaction gas mixture with a partial pressure of between about 20 mTorr and about 10 Torr, further optionally between about 23 mTorr and about 100 mTorr. Hydrogen having a partial pressure ratio $P_{H2}/P_{CH4}>200$ can result in a distinct hexagonal shape of grains as set forth in U.S. Patent Application Publication 2013/0174968 to Vlassiouk et al, filed Jan. 4, 2013, the disclosure of which is incorporated by reference in its entirety. The buffer gas can include argon or other noble gas (e.g., helium) or nitrogen to maintain atmospheric pressure within the CVD chamber.

Detaching the catalyst substrate from the at least one layer of graphene is depicted as step 14 in FIG. 1. This step includes any technique by which all or a portion of a catalyst substrate is removed from the at least one layer of graphene. For example, this step can include dissolving the catalyst substrate according to a chemical etching process. This step can alternatively include other processes without complete catalyst dissolution, such as electrochemical delamination. In embodiments where the catalyst substrate is dissolved, step 14 can include the use of a ferric chloride ($FeCl_3$) solution, a hydrogen chloride (HCl) solution, a presulfate solution, or other catalyst etchants. For example, the graphene-copper article, once removed from the CVD chamber, can be submerged in a temperature-regulated $FeCl_3$ solution for approximately one minute to several hours to remove the copper substrate from the graphene-copper article. Also by example, the graphene-copper article, once removed from the CVD chamber, can be submerged in a temperature-regulated $Na_2S_2O_8$ solution for approximately one minute to several hours to remove the copper substrate from the graphene-copper article. Other solutions can be used in other embodiments where desired, for example where the substrate is other than copper.

Figure 2:
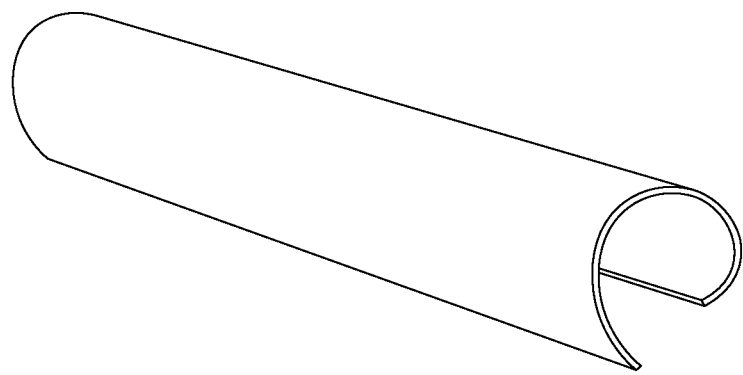
FIG. 2 illustrates a substantially pure graphene sheet or graphene-polymer sheet being rolled into a multi-wall scroll.

Consolidating or rolling the graphene layer onto itself to form a scroll is depicted as step 16 in FIG. 1, and illustrated in FIG. 2. This step can include floating the substantially pure graphene layer (i.e., substantially free of catalyst substrate and polymer) on a water solution surface. The graphene layer is then "scrolled" or rolled inward or outward onto itself multiple times. Alternative techniques include single-sided hydrogenation as disclosed in "Hydrogenation Enabled Scrolling of Graphene" in J. Phys. D: Appl. Phys. 46 (2013) by Zhu et al, and sonication as disclosed in "A Chemical Route to Carbon Nanoscrolls" by Viculis et al (2014), the disclosures of which is incorporated by reference in their entirety. The resulting graphene scroll (also referred to as a thread or a fiber) includes a substantially cylindrical shape with a spiral cross-section, e.g., having multiple internal walls of graphene film.

The above embodiment therefore provides a method of preparing a substantially pure graphene scroll. The graphene scroll can have a yield tensile strength greater than 1 GPa, optionally greater than 10 GPa (e.g., between 10 GPa and 30 GPa), and further optionally greater than 30 GPa (e.g., between 30 GPa and 50 GPa). The graphene scroll can include graphene crystals having hexagon or star-like grains with an average grain size sizes of 1 µm to 1 cm, optionally 1 µm to 1 mm, further optionally 1 µm to 100 µm, and still further optionally 1 µm to 10 µm. The graphene can include spectra intensity ratios of $I_D/I_G$ less than or equal to 1, less than or equal to 0.1, less than or equal to 0.01, and less than or equal to 0.001, for example.

The graphene scroll can include single-layer or multi-layer graphene formed on (and later detached from) various catalyst substrates (e.g., copper, nickel, cobalt, iron) and rolled up to form the graphene scroll. The above embodiment can be modified to include a polymer layer or a carbon layer, forming "heterostructures" or "composites." The composites can include single-layer graphene and/or multi-layer graphene. Multi-layer graphene can be prepared by the consequent transfer of several graphene layers on top of each other or growing multi-layer graphene directly on a catalyst substrate.

Figure 3:
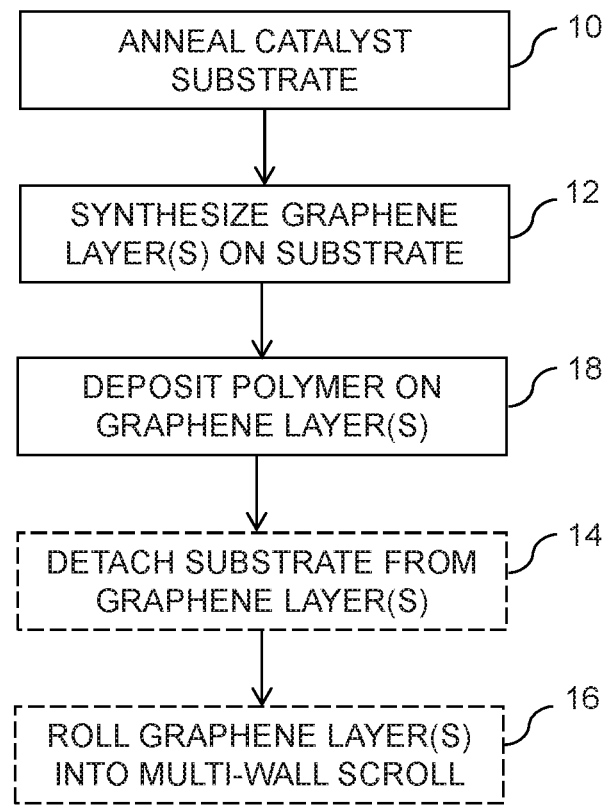
FIG. 3 is a flow chart illustrating a method for the controlled synthesis of a graphene-polymer composite.
Figure 4:
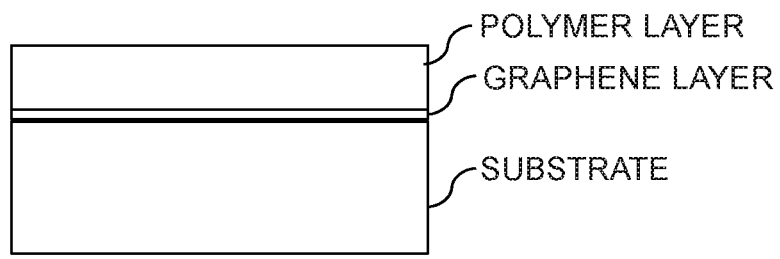
FIG. 4 illustrates a cross-section of a composite formed according to the method of FIG. 3.

More particularly, and with reference to FIG. 3, a flow chart illustrating formation of a graphene-polymer composite is illustrated. In general terms, a method for forming the graphene-polymer composite is similar to the method of FIG. 1, and includes deposition of a polymer or polymers on the synthesized graphene. The step is depicted as step 18 in FIG. 3. The polymer can include lignin, polyacrylonitrile (PAN), polymethyl methacrylate (PMMA), polystyrene, and polycarbonates, for example. Deposition of the polymer can include, for example, spin coating, spray coating, deep coating, and plasma polymerization, for example. Other deposition methods can be used in other embodiments as desired. Polymer deposition can occur prior to detaching of the catalyst substrate as shown in FIG. 4, or after detaching of the catalyst substrate. To reiterate, "detaching" as used herein includes any technique by which all or a portion of a catalyst substrate is removed from a graphene layer. Detaching includes, for example, dissolving all or a portion of the catalyst substrate, optionally according to a chemical etching process. Detaching also includes, for example, delaminating all or a portion of the catalyst substrate, optionally according to electrochemical delamination.

The sheet composite is optionally rolled onto itself to form a thread as depicted as step 16 in FIG. 3. This step can include floating the composite on a water solution before rolled inward or outward onto itself multiple times. The resulting scroll includes a substantially cylindrical shape with a spiral cross-section, e.g., having multiple internal walls of graphene film and polymer. The thickness of the polymer is optionally between about 20 nm and 10 μm inclusive, further optionally between about 100 nm and 500 nm inclusive, and still further optionally about 200 nm. The thickness of the graphene layer is optionally less than 20 nm in some embodiments, further optionally less than 10 nm, and even further optionally less than 3 nm.

Figure 5:
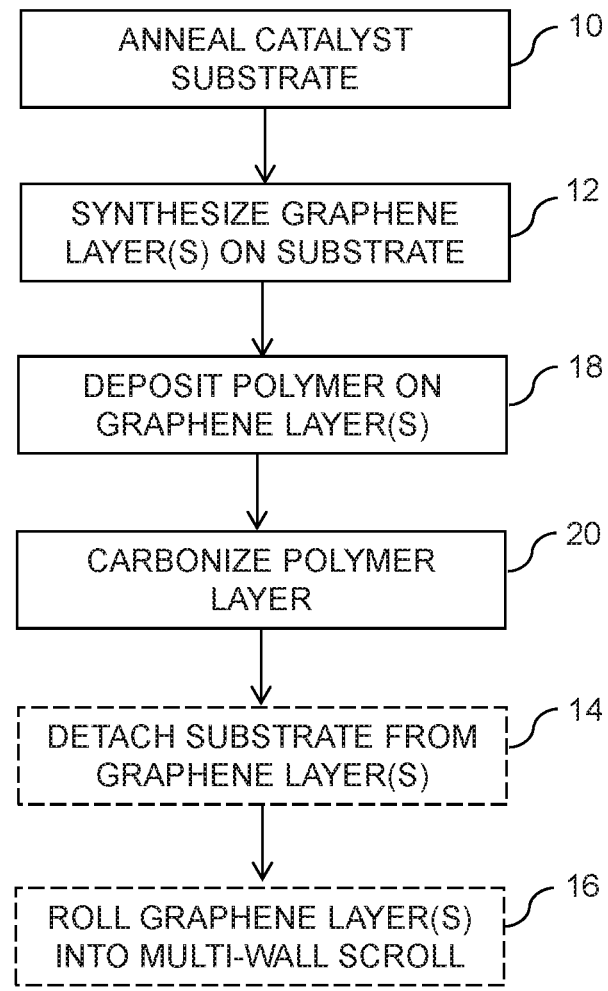
FIG. 5 is a flow chart illustrating a method for the controlled synthesis of a graphene-carbon composite.
Figure 6:
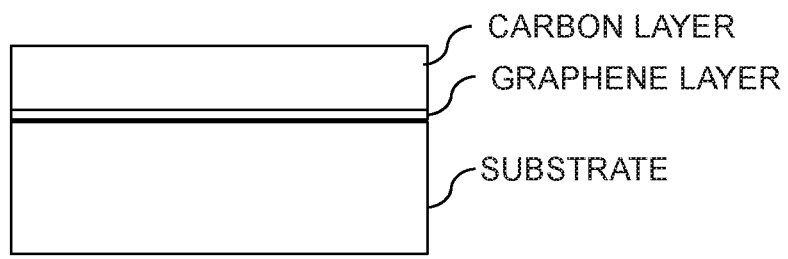
FIG. 6 illustrates a cross-section of a composite formed according to the method of FIG. 5.

After polymer deposition, and before scrolling, the polymer can be heat treated to carbonize the polymer as optionally shown in step 20 of FIG. 5. For example, a suitable carbon fiber precursor (e.g., PAN) can be (a) heated in air to a temperature ranging from 200° C. and 300° C. to form bonds between individual polymeric chains and (b) heated under inert conditions to a temperature ranging from 1000° C. to about 3000° C. to align the polymer chains. Carbonization can continue for a dwell period typically measured in minutes, resulting in the cross-linking of PAN fibers to achieve carbonized filaments. The resulting composite sheet includes mono-layer or multi-layer graphene, a carbonized PAN layer, and an optional substrate, illustrated in FIG. 6. The composite sheet can be rolled as depicted as step 16 in FIGS. 1 and 3, optionally after detaching the optional substrate at step 14 of FIG. 5. This step can include floating the composite on deionized water. The composite is then "scrolled" or rolled inward or outward onto itself multiple times. The resulting graphene reinforced carbon scroll includes a substantially cylindrical shape with a spiral cross-section, e.g., having multiple internal walls of monocrystalline graphene and carbon.

EXAMPLE

Graphene-acrylic scrolls were synthesized according to the following method, described with reference to FIGS. 7-10, which is intended to be non-limiting.

Graphene was synthesized by chemical vapor deposition under both atmospheric pressure and low pressure using methane as a precursor and using copper foil as a base layer. PMMA 495A4 solution available from MicroChem Corp. of Newton Mass. was spincoated at 2000 rpm on the copper-graphene sample. The copper base layer was then dissolved in 0.1M $FeCl_3$, which resulted in a graphene-reinforced PMMA sheet (PMMA having a thickness of about 200 nm). The graphene-reinforced PMMA sheet was floated on deionized water and rolled up to form a scroll.

Figure 7:
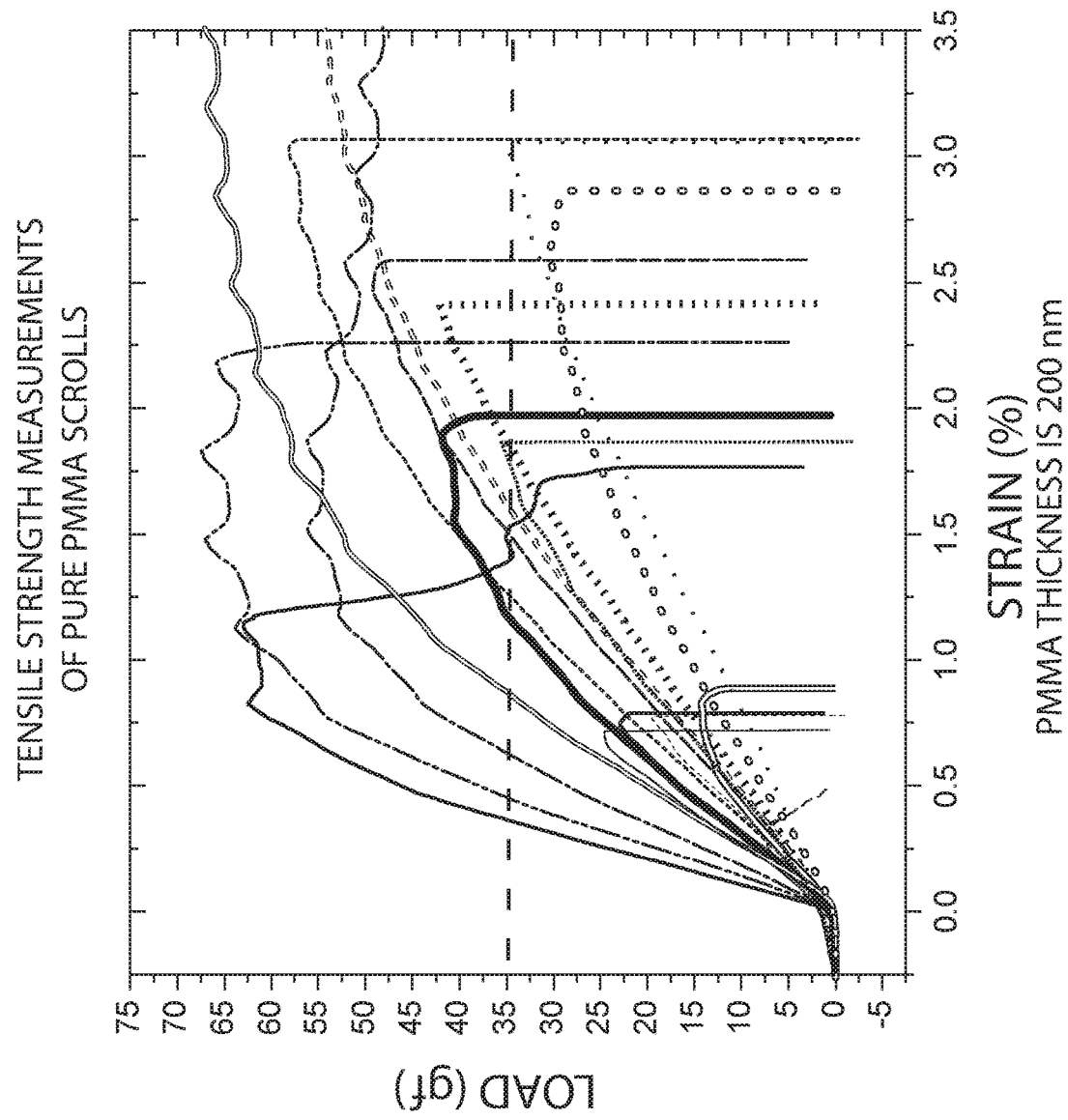
FIG. 7 is a strain-force curve for pure PMMA scrolls illustrating an average force value of 35 gf for failure.

Tensile strength was measured for the graphene reinforced PMMA scroll against unreinforced (e.g., pure) PMMA scrolls. Tensile strength measurements are depicted in FIG. 7 for pure PMMA scrolls. The average force value required to break the unreinforced PMMA scrolls was 35 gf (0.34 N), corresponding to a tensile strength of 34 MPA as shown in Equation 1 below, where F is the applied force and A is the cross-sectional area of the PMMA scroll:

$$\sigma = F/A = 0.34N/(0.05m * 200E-9m) = 34 \text{ MPa} \quad (1)$$

Figure 8:
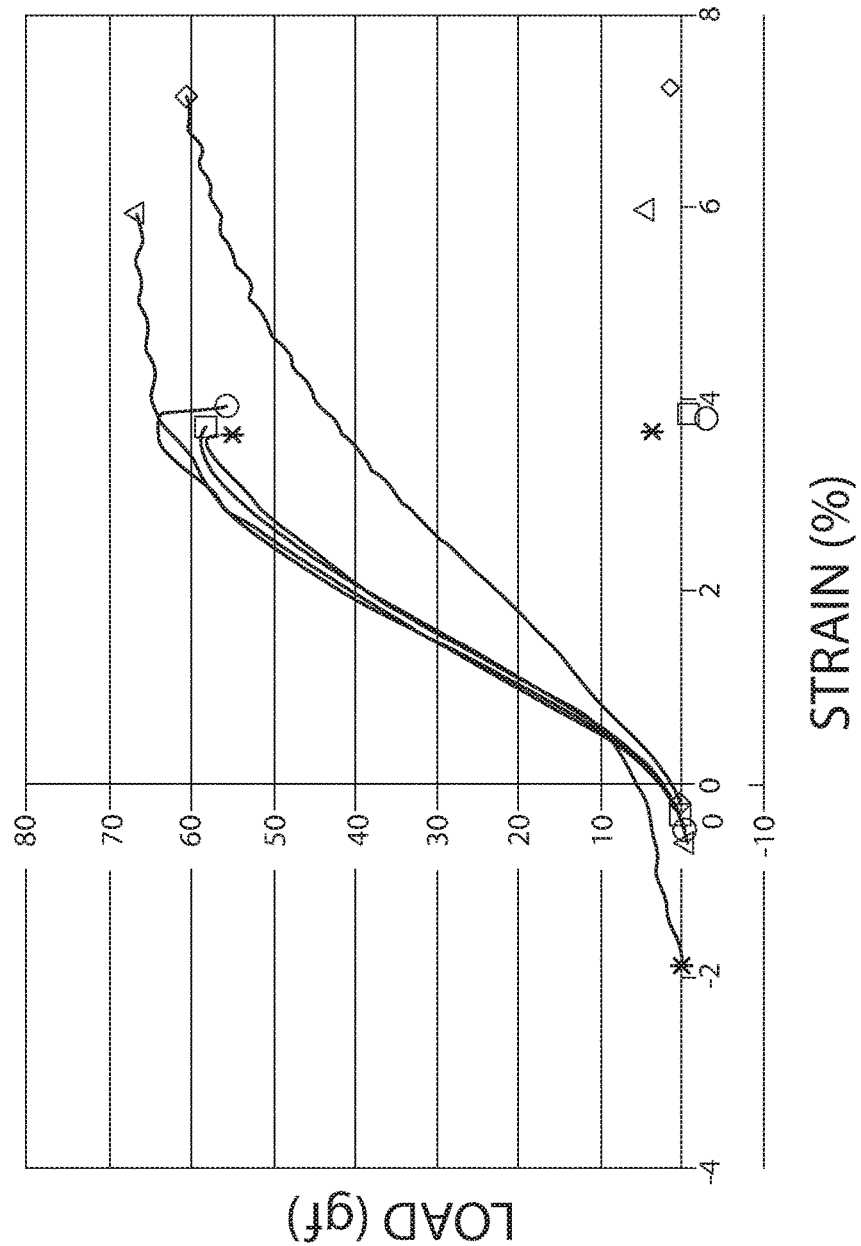
FIG. 8 is a strain-force curve for graphene-reinforced PMMA scrolls (atmospheric pressure CVD) illustrating an average force value of 65 gf for failure.
Figure 9:
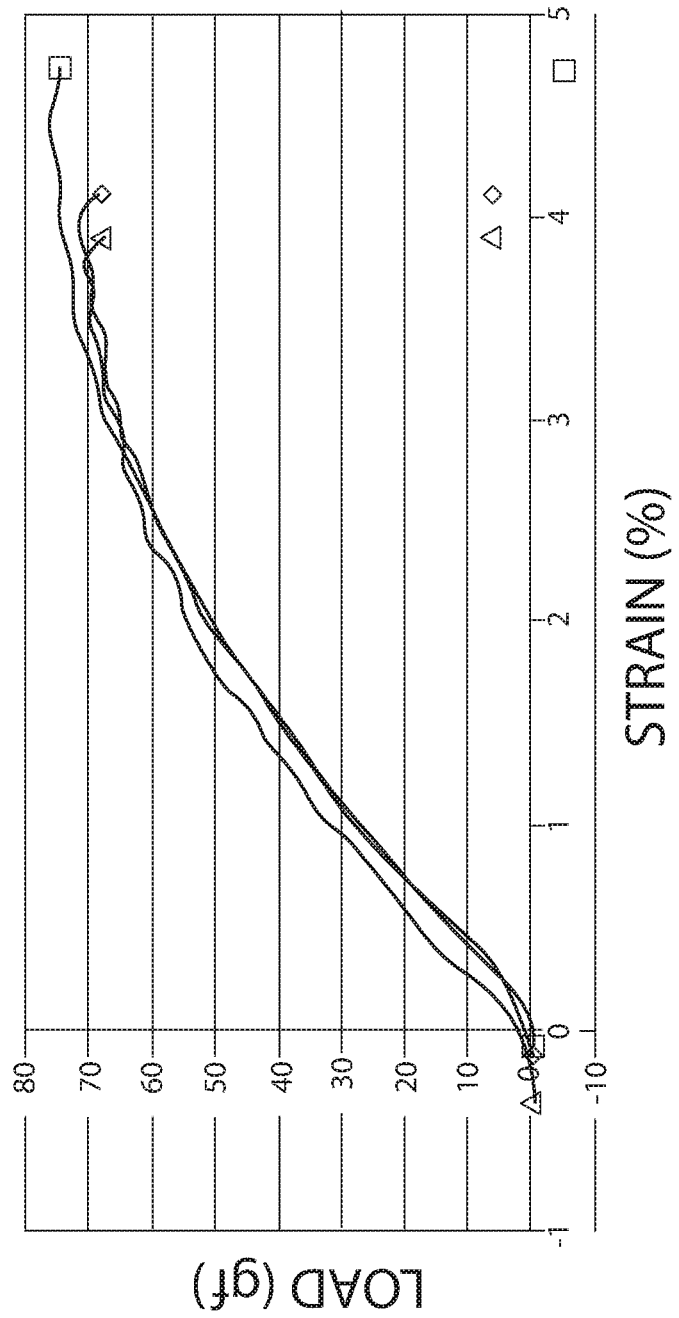
FIG. 9 is a strain-force curve for graphene-reinforced PMMA scrolls (low pressure CVD) illustrating an average force value of 65 gf for failure.
Figure 10:
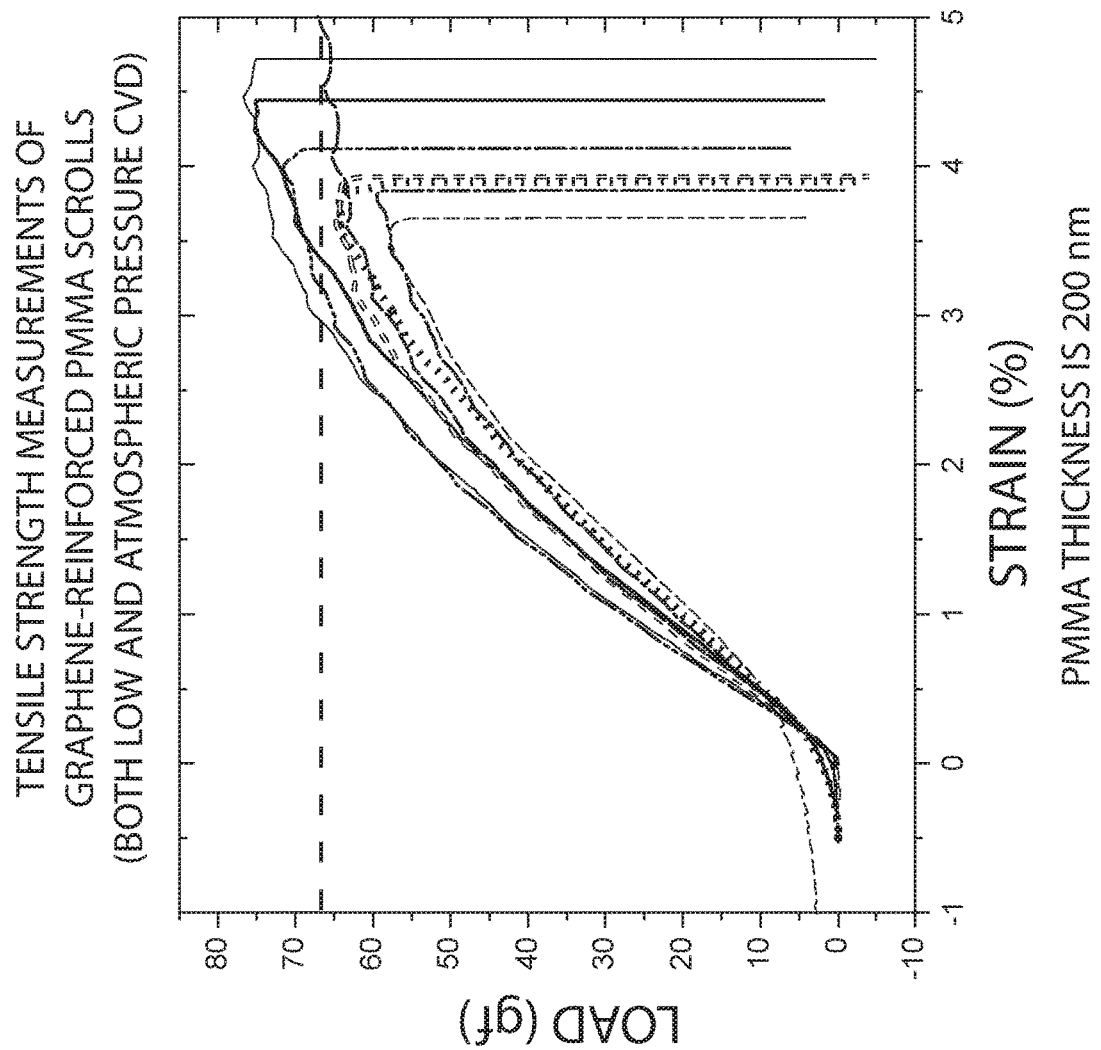
FIG. 10 is a strain-force curve for graphene-reinforced PMMA scrolls (low and atmospheric pressure CVD) illustrating an average force value of 65 gf for failure.

Tensile strength measurements for graphene-reinforced PMMA are depicted in FIGS. 8, 9 and 10 corresponding to graphene CVD synthesis at atmospheric pressure and low pressure, respectively. The average force value required to break graphene-reinforced PMMA scrolls was 65 gf (0.64 N), shown in FIG. 10. The graphene layer contributed 30 gf of strength to the PMMA scroll, corresponding to a tensile strength of 18 GPa as shown in Equation (2) below:

$$\sigma = F/A = 0.3N/(0.05m * 0.34E-9m) = 18 \text{ GPa} \quad (2)$$

Preliminary data suggested that even non-optimized conditions for graphene synthesis can yield materials with a tensile strength of 18 GPa, which is approximately 15% of the maximum theoretical value, five times stronger than aramid and three times stronger than carbon fiber.

The above description is that of current embodiments of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

The invention claimed is:

1. A graphene-reinforced article comprising:
   a sheet material comprising a polymer and having a first major surface opposite a second major surface; and
   a graphene layer coextensive with and joined to at least one of the first major surface and the second major surface of the polymer sheet material to form a composite structure, wherein the composite structure includes the graphene layer and the polymer sheet material rolled into a multi-walled cylindrical scroll having a spiral cross-section, the thickness of the graphene layer being less than 20 nm and the cylindrical scroll having a yield tensile strength greater than 1

GPa, wherein the polymer is carbonized and includes a thickness of between 20 nm and 10 μm, inclusive.

2. The graphene-reinforced article of claim 1 wherein the polymer is selected from the group consisting of lignin, polyacrylonitrile, polymethyl methacrylate, polystyrene, polycarbonate, polyimides, polypropylene, polyethylene terephthalate, and polyvinyl chloride.

3. The graphene-reinforced article of claim 2 wherein the polymer is carbonized by a method including heating the graphene-reinforced article in air to a temperature ranging from 200° C. to 300° C. followed by heating the graphene-reinforced article under inert conditions to a temperature ranging from 1000° C. to about 3000° C.

4. The graphene reinforced article of claim 1 wherein the graphene layer is multi-layer graphene.

5. The graphene-reinforced article of claim 1 further including a metal substrate joined to a surface of the graphene layer opposite of the sheet material.

6. The graphene-reinforced article of claim 5 wherein the metal substrate includes at least one of copper, nickel, iron, cobalt, platinum, gold, titanium, aluminum, and steel.

7. The graphene-reinforced article of claim 1 wherein the graphene reinforced article is substantially free of a metal substrate.

* * * * *